United States Patent
Rahy et al.

(10) Patent No.: US 10,150,909 B2
(45) Date of Patent: Dec. 11, 2018

(54) USE OF A BORON CROSS LINKER IN AN EMULSION SYSTEM

(71) Applicant: MAGNABLEND INC., Waxahachie, TX (US)

(72) Inventors: Abdelaziz Rahy, Waxahachie, TX (US); Raynard Rene Veldman, Mansfield, TX (US)

(73) Assignee: Magnablend, Inc., Waxahachie, TX (US)

( * ) Notice: Subject to any disclaimer, the term of this patent is extended or adjusted under 35 U.S.C. 154(b) by 0 days.

(21) Appl. No.: 15/110,545

(22) PCT Filed: Jan. 7, 2015

(86) PCT No.: PCT/US2015/010462
§ 371 (c)(1),
(2) Date: Jul. 8, 2016

(87) PCT Pub. No.: WO2015/105862
PCT Pub. Date: Jul. 16, 2015

(65) Prior Publication Data
US 2016/0326426 A1 Nov. 10, 2016

Related U.S. Application Data

(60) Provisional application No. 61/925,912, filed on Jan. 10, 2014.

(51) Int. Cl.
*C09K 8/68* (2006.01)
*C09K 8/26* (2006.01)
(Continued)

(52) U.S. Cl.
CPC ............... *C09K 8/685* (2013.01); *C09K 8/26* (2013.01); *C09K 8/36* (2013.01); *C09K 8/887* (2013.01); *C09K 8/90* (2013.01); *E21B 43/26* (2013.01)

(58) Field of Classification Search
CPC ........... E21B 43/26; C09K 8/68; C09K 8/685; C09K 8/26; C09K 8/36; C09K 8/88; C09K 8/887; C09K 8/90
See application file for complete search history.

(56) References Cited

U.S. PATENT DOCUMENTS

| | | |
|---|---|---|
| 5,488,083 A | 1/1996 | Kinsey, III et al. |
| 6,225,264 B1 | 5/2001 | Moorhouse et al. |
| | (Continued) | |

FOREIGN PATENT DOCUMENTS

| | | |
|---|---|---|
| EP | 1331358 A1 | 7/2003 |
| WO | WO 03/014520 A1 | 2/2003 |
| WO | WO 2007/030435 A1 | 3/2007 |

OTHER PUBLICATIONS

International Search Report and Written Opinion for International Application No. PCT/US2015/010462, dated May 4, 2015 (10 pages).

*Primary Examiner* — Zakiya W Bates
*Assistant Examiner* — Crystal J Miller
(74) *Attorney, Agent, or Firm* — Brinks Gilson & Lione

(57) ABSTRACT

Methods, fluids, compositions, and suspensions are provided for treating subterranean formations. The fluids can be servicing fluids, such as drilling or fracturing fluids. The fluids may include an aqueous base fluid and a polysaccharide. The aqueous base fluid may be admixed with a crosslinker suspension. The crosslinker suspension may include an emulsion, an emulsifier, and a boron containing compound.

14 Claims, 1 Drawing Sheet

(51) Int. Cl.
  *E21B 43/26* (2006.01)
  *C09K 8/36* (2006.01)
  *C09K 8/88* (2006.01)
  *C09K 8/90* (2006.01)

(56) References Cited

U.S. PATENT DOCUMENTS

| | | | | |
|---|---|---|---|---|
| 8,708,045 | B2* | 4/2014 | Ogle | C09K 8/12 |
| | | | | 166/300 |
| 9,080,135 | B2* | 7/2015 | Hough | A61K 8/8152 |
| 9,534,167 | B2* | 1/2017 | Legemah | C07F 5/025 |
| 2003/0029616 | A1* | 2/2003 | Maberry | C09K 8/502 |
| | | | | 166/294 |
| 2004/0067854 | A1 | 4/2004 | Dobson, Jr. et al. | |
| 2006/0009363 | A1* | 1/2006 | Crews | C09K 8/685 |
| | | | | 507/100 |
| 2008/0103068 | A1 | 5/2008 | Parris | |
| 2010/0270022 | A1* | 10/2010 | Crews | C09K 8/685 |
| | | | | 166/308.3 |
| 2011/0223125 | A1* | 9/2011 | Hough | A61K 8/8152 |
| | | | | 424/70.12 |
| 2012/0004148 | A1* | 1/2012 | Ogle | C09K 8/12 |
| | | | | 507/213 |
| 2013/0213657 | A1* | 8/2013 | Dobson, Jr. | C09K 8/24 |
| | | | | 166/308.5 |
| 2013/0220621 | A1* | 8/2013 | Legemah | C07F 5/025 |
| | | | | 166/308.5 |
| 2015/0005204 | A1* | 1/2015 | Alwattari | C04B 28/02 |
| | | | | 507/211 |

* cited by examiner

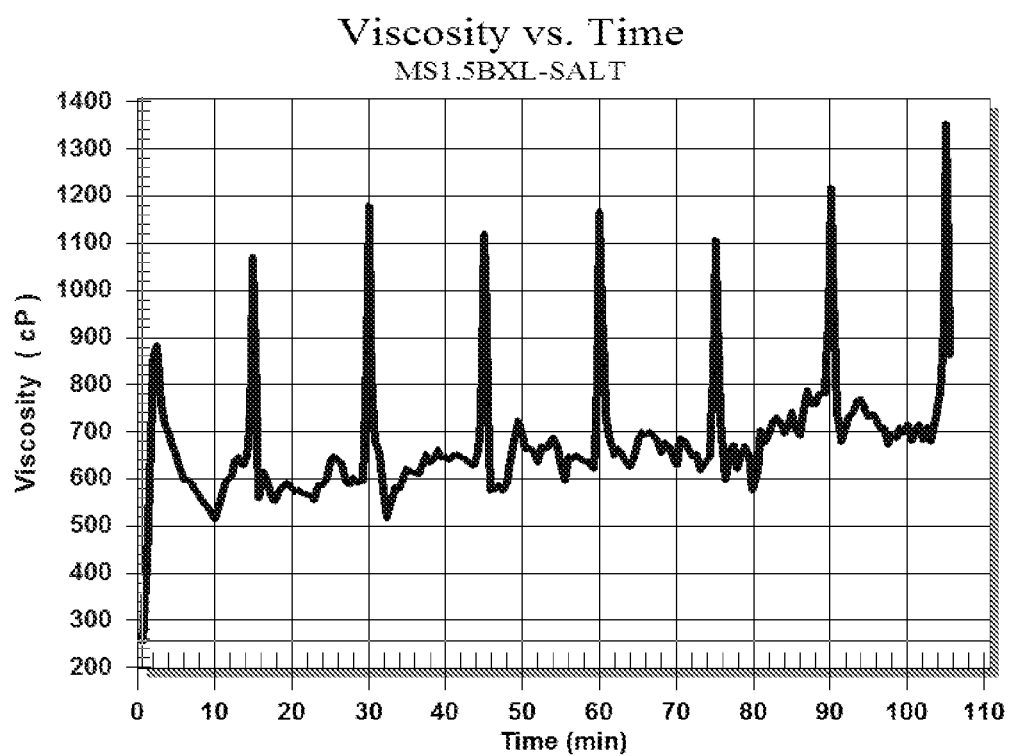

USE OF A BORON CROSS LINKER IN AN EMULSION SYSTEM

CROSS-REFERENCE TO RELATED APPLICATIONS

The present application claims the benefit of U.S. Provisional Patent Application No. 61/925,912, filed on Jan. 10, 2014, the contents of which are incorporated into the present application in their entirety.

BACKGROUND

1. Field of the Invention

The present disclosure generally relates to compositions and methods for treating subterranean formations. More particularly, the present disclosure relates to a crosslinking system for increasing the viscosity of a well servicing fluid.

2. Description of the Related Art

In the oil and gas, water well, and injection well industries, boreholes are drilled into subterranean formations and certain fluids may then be introduced therein. A number of different types of fluids are used in drilling, completing, and working over an oil, gas, water, and/or injection well completed in a subterranean formation. Subterranean formations can be any buried rock structure where the flow of fluids into or out of the formation is desired. These formations may include, but are not limited to, sandstones, limestones, dolomites, shales, coal beads, and diatomeatous earth. The subterranean formation may produce oil, gas, water, condensate, or any combination thereof.

The subterranean formation may also be used for the injection of fluids. The injected fluid may be a water based fluid, brine, a polymer solution, gas, or $CO_2$. The flow of fluids into and out of the formation may be through natural permeability, enhanced permeability, natural fractures, man-made fractures, or geologic features, such as seams and faults.

A well servicing fluid can be any fluid used in drilling, completing or workover operations performed in the subterranean formation. These can include, but are not limited to, drilling fluids, drill-in fluids, fracturing fluids, gravel packing fluids, completion fluids, workover fluids, stimulation fluids, chemical treatment fluids, perforating fluids, well cleanout fluids, spacer fluids, polymer flooding fluid, a kill fluid, or a lost circulations fluid.

In a number of cases, the well servicing fluid needs a relatively high viscosity to perform a desired function. The function may include, but is not limited to, particles suspension and transport, fluid leakoff control, pressure buildup, altering the injection profile, and any combination of these. Generally, the viscosity is gained by the addition of a polysaccharide, such as guar and any of its derivatives. Even greater viscosity is achieved by adding a material referred to in the art as a crosslinker. A crosslinker is a chemical compound that is capable of forming a chemical link between a site on one polymer with a site on another polymer. This crosslinking can increase the viscosity (or apparent viscosity) several fold, perhaps even as high as hundreds of fold increase.

Boron based compounds are well known in the art as useful for crosslinking polysaccharides. Illustrative examples of boron compounds include borax and boric acid. Some naturally occurring boron containing minerals are also useful as crosslinkers. These minerals, illustratively including ulexite and colemanite, have the added advantage of crosslinking the fluid in a delayed manner.

Having some delay in the crosslinking time can be advantageous in reducing the amount of pressure required to convey the fluid down the well casing, tubing, coiled tubing, or drill pipe. The reduction in surface pumping pressure can allow a higher pumping rate (measured in barrels per minute, bpm) where the higher pumping rate may increase the efficiency of the action of the well servicing fluid. For example, in hydraulic fracturing a high pumping rate may be desired in order to get the designed width, length, or height of the fracture, or to carry proppant a given distance from the wellbore.

As stated above, the boron containing minerals, such as ulexite and colemanite, function as crosslinkers and do so with some delay in the onset of crosslinking, especially when compared to the substantially instant crosslinking from the more water soluble boron compounds, such as borax or boric acid. Even further delays have been seen with these mineral based crosslinkers when they are suspended in oil based fluid system. The addition of this oil based suspension system to a crosslinkable polysaccharide solution has a delay in crosslink time that is materially longer than that observed with adding the mineral based crosslinker as a dry powder. An oil based suspension of a boron mineral generally comprises a boron mineral powder, an oil, a clay for suspension, a surfactant, an activator. Although a material delay is seen with this type of crosslinker suspension package, the use of clays is generally undesirable since it can result in damage to the conductivity of the fracture or cause formation damage.

Water based suspension packages have been developed that may be formulated, for example, with water, ethylene glycol, xanthan or diutan, an acid, and ulexite. Again, these suspensions give the desired delay in crosslink time, but there can be issues with degradation of the xanthan or diutan with time, limiting shelf life of the product.

Thus, there is a need for a suspension system for a boron containing mineral powder without the limitation and disadvantages of those know in the art.

BRIEF SUMMARY

Compositions, fluids, suspensions, and methods for treating subterranean formations are disclosed herein. In one aspect, a crosslinker suspension is provided comprising an emulsion including an aqueous fluid and an oil, an emulsifier, and a boron containing compound.

In an additional aspect, a method for treating a subterranean formation is provided. The method comprises the steps of providing an aqueous base fluid comprising a polysaccharide and admixing the aqueous base fluid with a crosslinker suspension to form a well servicing fluid. The crosslinker suspension includes an emulsion comprising an aqueous fluid, an oil, an emulsifier, and a borate containing compound. The method further comprises the step of injecting the well servicing fluid into the subterranean formation.

The foregoing has outlined rather broadly the features and technical advantages of the present disclosure in order that the detailed description that follows may be better understood. Additional features and advantages of the disclosure will be described hereinafter that form the subject of the claims of this application. It should be appreciated by those skilled in the art that the conception and the specific embodiments disclosed may be readily utilized as a basis for modifying or designing other embodiments for carrying out the same purposes of the present disclosure. It should also be realized by those skilled in the art that such equivalent embodiments do not depart from the spirit and scope of the disclosure as set forth in the appended claims.

BRIEF DESCRIPTION OF THE SEVERAL VIEWS OF THE DRAWINGS

FIG. 1 depicts a graph of data collected in connection with testing an aspect of the presently disclosed crosslinker suspension comprising an oil in water emulsion containing ulexite.

DETAILED DESCRIPTION

Various embodiments are described below. The relationship and functioning of the various elements of the embodiments may better be understood by reference to the following detailed description. However, embodiments are not limited to those illustrated in the detailed description. It should be understood that in certain instances, details may have been omitted that are not necessary for an understanding of embodiments disclosed herein, such as conventional techniques or procedures used in the field or laboratory.

The present disclosure relates to methods and well servicing fluids for treating subterranean formations. In some aspects, the well servicing fluid comprises an aqueous base fluid, a polysaccharide polymer, and a crosslinker suspension.

The aqueous base fluid may comprise water, salt solution, a buffered solution, a brine, seawater, brackish water, and any mixture thereof. A number of additives can be added to the base fluid in certain aspects of the present disclosure, such as surfactants, mutual solvents, alcohols, biocides, friction reducers, scale inhibitors, clay control agents, pH control chemicals, proppant, sand, diverting agents, polymer breakers such as oxidizers and enzymes, gel stabilizers, fluid loss agents, and any combination thereof. Other additives may be added as well so long as they do not significantly interfere with the crosslinking of the polysaccharide. One having ordinary skill in the art will know how to determine capability of an additive with the servicing fluid, such as by testing in a Fann™ Model 50.

In some aspects, the aqueous base fluid comprises a polysaccharide in solution. The polysaccharide may be any polymer that can be crosslinked by a boron containing compound. In certain aspects, the polysaccharide, acting as a viscosifying agent, is selected from the group consisting of substituted galactomannans, guar gums, high-molecular weight polysaccharides composed of mannose and galactose sugars, guar derivatives, hydroxypropyl guar (HPG), carboxymethylhydroxypropyl guar (CMHPG) and carboxymethyl guar (CMG), hydrophobically modified guars, guar-containing compounds, hydroxyethylcellulose (HEC), derivatives of HEC, hydroxypropylcellulose (HPC), carboxymethylhydroxyethylcellulose (CMHEC), carboxymethycellulose (CMC), xanthan, diutan, scleroglucan, and any combination thereof.

In some aspects, the crosslinker suspension of the present disclosure may comprise an aqueous phase, such as water, an oil phase, one or more emulsifiers, and one or more boron containing compounds (crosslinking agents). In certain aspects, a winterizing agent may also be included. The components of the crosslinker suspension may be combined in a way that an emulsion of the aqueous phase and oil phase is formed. In some aspects, the crosslinker suspension comprises an emulsion, such as a water-in-oil emulsion or an oil-in-water emulsion. In certain aspects, the crosslinker suspension comprises a water-in-oil emulsion, meaning that the continuous phase or major phase of the emulsion is oil. In some aspects, the emulsion may comprise from about 8% to about 40% of the oil and from about 10% to about 40% of the aqueous phase by weight.

Emulsifiers are surface active agents and, in accordance with the present disclosure, may include anionic surfactants, cationic surfactants, nonionic surfactants, amphoteric surfactants, and any combination thereof. In some aspects, the emulsifier is a non-ionic surface active agent having a hydrophilic lipophilic balance (HLB) value of about 2 to about 8. In some aspects, the emulsifier is selected from the group consisting of polyoxyethylene fatty alcohol ethers, polyether modified polyorganosiloxane, oleic acid ethoxylates, alkylphenol ethoxylates vinyl ether, polyoxyethylene castor oil ether, pyrollidones, amides from fatty acids, ether sulfates, or a sorbitane sesquioleate range between about 1 to about 6%.

In some aspects, the oil is a hydrocarbon oil. In some aspects, the hydrocarbon oil is a low viscosity hydrocarbon oil. In certain aspects, the oil is selected from the group consisting of diesel oil, mineral oil, refined oil, petroleum oils treated for removal of aromatics such as benzene, toluene, ethyl benzene and xylene, synthetic highly refined paraffins, a synthetic blend of paraffin, olefin, and oxygenates, hexane, heptane, octane, an aromatic compound such as benzene, toluene, or xylene, kerosene, lubricating oil, vegetable oils such as canola, soybean, and grape seed, and any combination thereof. The crosslinker suspension generally comprises from about 8% to about 20% by weight of the oil.

The boron containing compound used in the crosslinker suspension may be any boron containing compound that makes boron available for the crosslinking purpose. In some aspects, the boron containing compound may be selected from the group consisting of boric acid, pyroboric acid, metaboric acid, borax, sodium tetraborate, ulexite, colemanite, probertite, nobleite, gowerite, frolovite, meyerhofferite, inyoite, priceite, tertschite, ginorite, hydroboracite, inderborite, and any combination thereof. The boron containing compound may be a slightly water soluble borate.

Any amount of one or more boron containing compounds may be added to the suspension. For example, in some aspects, the suspension comprises from about 40% to about 50% by weight of the boron compound.

As previously noted, the aqueous fluid of the crosslinker suspension may comprise a winterizing agent. In some aspects, the winterizing agent is selected from the group consisting of ethylene glycol, propylene glycol, polyethylene glycol, polypropylene glycol, methanol, isopropanol, sodium formate, potassium formate, potassium acetate, and any combination or mixture thereof.

In some aspects of the present disclosure, the crosslinker suspension may comprise an aqueous phase, an oil phase, an emulsifier, and a boron containing compound. The components are mixed in such a way that an emulsion forms with sufficient suspension properties to suspend the boron compound, which may be in powder form. In other aspects, the crosslinker suspension consists of an aqueous phase, an oil phase, an emulsifier, and a boron containing compound, and any other components are expressly excluded. In still other aspects, the crosslinker suspension consists essentially of an aqueous phase, an oil phase, an emulsifier, and a boron containing compound, and any other components that materially affect the basic and novel characteristics of the suspension are expressly excluded, such as clays, resins, suspending agents, colloidal silicas/fumed silicas, dispersing agents, etc. In any aspect, the aqueous phase and the oil phase may form an emulsion, such as a water-in-oil emulsion.

The crosslinker suspension of the present disclosure includes numerous surprising and unexpected advantages. Various chemical agents can be added to the aqueous phase of the crosslinker suspension that change the crosslinking delay time. When the acid is added it dissolves a portion of the ulexite (or other boron containing compound) to boric acid, which is a surface crosslink. By adding only the acid without any boric acid, a combination of a surface and a delayed crosslink is obtained in a single formulation. When a base is added, a combination of a self-buffering, surface and delayed crosslink is obtained in a single formulation. Moreover, it has been discovered that by using an emulsion based crosslinker suspension, such as a water-in-oil emulsion based crosslinker suspension, various additives that are required in the prior art may be excluded, such as clays, resins, and additional suspending agents. Without wishing to be bound by any theory, it is considered that the emulsion itself acts to suspend the boron containing compound therein and alleviate the need for an additional suspending agent, such as clay or resin.

The well servicing fluids of the present disclosure may comprise the crosslinker suspension. The well servicing fluids, or the crosslinker suspension alone, may be used in many different applications, as described above. In one aspect, the well servicing fluid comprising the crosslinker suspension may be used for fracturing gas shales. To create productive natural gas wells, an operator may force fluid thousands of feet below the earth's surface at high pressure to crack shale rock and release trapped natural gas. This extraction technique is called hydraulic fracturing. The fluid used in the process generally comprises water and sand. However, it also may include a small percentage of chemical additives that aid the overall process.

The fracture is created when a fluid is pumped down the well at high pressure for short period of time. The high pressure fluid (usually water with fluid additive to increase the viscosity) exceeds the tensile strength of the rock and initiates a fracture in the rock. A propping agent or proppant, usually sand carried by the viscous fluid, is pumped into the fracture to keep it from closing when the pumping pressure is released. The viscous fluid pumped to propagate the fracture is converted into a low viscosity fluid in short time with the addition of a breaker. The broken fluid flows back through the created fracture to the well and, with no flow restrictions, up to the surface once the well is put on production. The technique forms an open channel for the natural gas and oil which are trapped in the rock to flow to the surface.

One of the key elements in this process is to obtain sufficiently high fluid viscosity at down-hole temperature and pressure to create a fracture in the reservoir and transport as much of the intended volume of proppant particles into the newly created fracture as possible, as well as to impair loss of fracturing fluids to the formation during the treatment. In addition, an adequately viscous fluid shall prevent proppant settling, which may cause lines plugging and create undesirable solid handling problems.

The cross linking agent, such as the boron containing compound, is an important component of the fracturing fluid in certain aspects. High viscosity may be attained by either increasing the polymer concentration or by crosslinking the polymer. Increasing the polymer concentration is normally not cost-effective and may cause operational problems.

Guar gum and its derivatives are widely used as thickeners for the hydraulic fracturing processes. Low concentrations of guar gum (e.g., 0.3-0.5%), dissolved or suspended in water, will significantly increase the viscosity of the fluid (e.g., from 1 to 150 cP), while the addition of millimolar amounts of a cross linking agent, such as borate ion, to the guar gum solution, will substantially increase the viscosity several orders of magnitude (e.g., to 5700 cP, as measured at low shear rate).

Borate ion has long been used as a cross-linking agent for forming high viscosity cross-linked gelled aqueous well treating fluids. For example, EP-A-0347975 describes an aqueous acidic solution of a galactomannan gum and a borate releasing compound, into which is dispersed base activator slurry comprising a water-soluble base and nonionic surfactant in a hydrophobic carrier. Various sources of borate have been utilized including boric acid, borax, sodium tetraborate, slightly water soluble borates such as ulexite, and other compositions comprised of boric acid and dimers and trimers of borate ions. These solid materials which form or contain borate ion have varying solubilities in water and can cause operational problems when used as cross-linking agents in the preparation of high viscosity cross-linked gelled aqueous well treating fluids.

For example, when weather conditions are damp or wet, the solids tend to clump, whereby they are difficult to meter into a gelled solution. While the solid materials are soluble in water, it is generally difficult to prepare a high concentration of around 20 to 50% solids in solution of the materials. When high concentration solutions are prepared and used, large volumes are generally required. Also, in cold weather, the high concentration solutions crystallize making pumping and metering difficult.

Crosslinkers are used to increase the molecular weight of the polymer by crosslinking the polymer backbone into a 3D structure. This increases the base viscosity of the linear gel from less than 50 cps into the 100's or 1000's of cps range. This crosslinking also increases the elasticity and proppant transport capability of the fluid. For guar and CMHEC based gels, boron and several metals including titanium and zirconium are used as crosslinkers. In addition to these materials, iron, chromium and aluminum will crosslink guar, but these are not commonly used. Iron is a major contaminant for fracturing fluids and is one of the metals that must be carefully controlled during the quality control process to prevent premature crosslinking. Each crosslinker has a unique reaction requirement and behavior.

The present inventors have discovered that guar containing hydraulic fracturing fluids having enhanced thermal stability and decreased leak off rate can be obtained utilizing from about 1.5 kg/m$^3$ to about 15 kg/m$^3$ of a soluble borate having a slow solubility rate to provide sufficient borate anions to crosslink the guar polymer, raise the pH, and provide a reserve of available borate ions to crosslink the polymer at high temperature. It has also been found that alkaline earth metal borates or alkali metal alkaline earth metal borates have unique solubility characteristics, which enable them to be used in the controlled crosslinking of aqueous systems containing guar polymers. The rate of crosslinking can be controlled by suitable adjustment of one or more of the following variables: initial pH of the aqueous system, relative concentration of one or more of the sparingly soluble borates, temperature of the aqueous system, and particle size of the borate.

In one aspect of the present disclosure, a method of treating a subterranean formation is provided. The method comprises the step of providing an aqueous base fluid comprising a crosslinkable polysaccharide in solution. The aqueous base fluid is admixed with a delayed crosslinker suspension to form a well servicing fluid. The crosslinker suspension comprises an emulsion and the emulsion comprises an aqueous fluid, an oil, an emulsifier, and, in some aspects, a powder of a boron containing compound. The components are admixed long enough, such as from about one to about five minutes, to allow the polysaccharide to at least partially crosslink. The well servicing fluid is then injected into the subterranean formation.

EXPERIMENTAL EXAMPLE

A mixture was created comprising 40 lb per thousand gallons of fast hydrating guar in tap water, 2 gallons per thousand gallons of 70% choline chloride, 0.5 gallons per thousand gallons of a non-emulsifying surfactant, 3 gallons per thousand gallons of gel stabilizer 30% sodium thiosulfate, 2 gallons per thousand gallons of potassium carbonate solution buffer, and 3 gallons per thousand gallons of the presently disclosed crosslinker suspension comprising an oil in water emulsion containing ulexite. The measurements were done at 100 inverse seconds and 250° F. on a Grace model 5600 viscometer. As can be seen in FIG. 1, the viscosity developed over 500 to 750 centipoise in about 2 to about 3 minutes which remained stable for over two hours.

All of the compositions and methods disclosed and claimed herein can be made and executed without undue experimentation in light of the present disclosure. While this invention may be embodied in many different forms, there are described in detail herein specific preferred embodiments of the invention. The present disclosure is an exemplification of the principles of the invention and is not intended to limit the invention to the particular embodiments illustrated. In addition, unless expressly stated to the contrary, use of the term "a" is intended to include "at least one" or "one or more." For example, "a boron containing compound" is intended to include "at least one boron containing compound" or "one or more boron containing compounds."

Any ranges given either in absolute terms or in approximate terms are intended to encompass both, and any definitions used herein are intended to be clarifying and not limiting. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges (including all fractional and whole values) subsumed therein.

Furthermore, the invention encompasses any and all possible combinations of some or all of the various embodiments described herein. It should also be understood that various changes and modifications to the presently preferred embodiments described herein will be apparent to those skilled in the art. Such changes and modifications can be made without departing from the spirit and scope of the invention and without diminishing its intended advantages. It is therefore intended that such changes and modifications be covered by the appended claims.

What is claimed is:

1. A crosslinker suspension consisting of:
   an emulsion consisting of an aqueous fluid, an oil, and an additive in the aqueous fluid selected from a dissolved salt, an acid, a base, a winterizing agent, and any combination thereof, wherein the winterizing agent is selected from the group consisting of ethylene glycol, propylene glycol, polyethylene glycol, polypropylene glycol, methanol, isopropanol, sodium formate, potassium formate, potassium acetate, and any combination thereof,
   an emulsifier, and
   a boron containing compound selected from the group consisting of ulexite, colemanite, and any combination thereof.

2. The crosslinker suspension of claim 1, wherein the emulsion is a water-in-oil emulsion.

3. The crosslinker suspension of claim 1, wherein the emulsion comprises from about 1% to about 6% of the emulsifier.

4. The crosslinker suspension of claim 1, wherein the emulsion comprises from about 10% to about 50% of the boron containing compound.

5. The crosslinker suspension of claim 1, wherein the dissolved salt is selected from the group consisting of sodium chloride, potassium chloride, calcium chloride, ammonium chloride, magnesium chloride, sodium bromide, potassium bromide, calcium bromide, and any combination thereof.

6. The crosslinker suspension of claim 1, wherein the base is selected from the group consisting of sodium hydroxide, sodium carbonate, potassium hydroxide, potassium carbonate, calcium hydroxide, and any combination thereof.

7. The crosslinker suspension of claim 1, wherein the emulsifier is selected from the group consisting of polyoxyethylene fatty alcohol ethers, polyether modified polyorganosiloxane, oleic acid ethoxylates, alkylphenol ethoxylates vinyl ether, polyoxyethylene castor oil ether, pyrrolidones, amides from fatty acids, amides from ether sulfates, amides from sorbitane sesquioleate, and any combination thereof.

8. The crosslinker suspension of claim 1, wherein the oil is selected from the group consisting of diesel oil, conventional mineral oil, refined oils, vegetable oils, synthetic highly refined paraffin, a synthetic blend of paraffin, olefin, and oxygenated solvent, and any combination thereof.

9. A method for treating a subterranean formation comprising:
   providing an aqueous base fluid comprising a polysaccharide,
   admixing the aqueous base fluid with a crosslinker suspension to form a well servicing fluid, wherein the crosslinker suspension consists of:
      an emulsion consisting of an aqueous fluid, an oil, an additive in the aqueous fluid selected from a dissolved salt, an acid, a base, a winterizing agent, and any combination thereof, an emulsifier, and a borate containing compound selected from the group consisting of ulexite, colemanite, and any combination thereof,
   wherein the winterizing agent is selected from the group consisting of ethylene glycol, propylene glycol, polyethylene glycol, polypropylene glycol, methanol, isopropanol, sodium formate, potassium formate, potassium acetate, and any combination thereof, and
   injecting the well servicing fluid into the subterranean formation.

10. The method of claim 9, wherein the aqueous base fluid is selected from the group consisting of water, brine, seawater, brackish water, a salt solution, and any combination thereof.

11. The method of claim 9, wherein the polysaccharide is a crosslinkable polymer.

12. The method of claim 11, wherein the crosslinkable polymer is guar, hydroxypropylguar, carboxymethylhydroxypropylguar, and any combination thereof.

13. The method of claim 9, wherein the emulsion is a water-in-oil emulsion.

14. The method of claim 9, wherein the aqueous base fluid comprises from about 10% to about 50% of the crosslinker suspension.

* * * * *